US012623201B2

(12) United States Patent (10) Patent No.: US 12,623,201 B2
Wei et al. (45) Date of Patent: \*May 12, 2026

(54) LITHIUM ADSORBENT AND METHOD FOR LITHIUM EXTRACTION FROM SALT LAKE

(71) Applicant: BYD COMPANY LIMITED, Shenzhen (CN)

(72) Inventors: Jialiang Wei, Shenzhen (CN); Hongye Lin, Shenzhen (CN); Junlan Lian, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 688 days.

This patent is subject to a terminal disclaimer.

(21) Appl. No.: 18/086,729

(22) Filed: Dec. 22, 2022

(65) Prior Publication Data

US 2023/0201793 A1 Jun. 29, 2023

(30) Foreign Application Priority Data

Dec. 28, 2021 (CN) .......................... 202111630402.6

(51) Int. Cl.
  B01J 20/08 (2006.01)
  B01D 15/08 (2006.01)
  (Continued)

(52) U.S. Cl.
  CPC .............. B01J 20/08 (2013.01); B01D 15/08 (2013.01); B01J 20/261 (2013.01); B01J 20/262 (2013.01);
  (Continued)

(58) Field of Classification Search
  CPC .... B01J 20/08; B01J 20/2803; B01J 20/2808; B01J 20/28083; B01J 20/28085;
  (Continued)

(56) References Cited

U.S. PATENT DOCUMENTS 4,599,221 A * 7/1986 Ketzinel ............. C22B 60/0265
                                                            423/7
2004/0245496 A1* 12/2004 Taoda .................. C11D 3/3947
                                                            252/186.1
  (Continued)

FOREIGN PATENT DOCUMENTS

CN          101928828 A      12/2010
CN          102631897 A       8/2012
  (Continued)

OTHER PUBLICATIONS

English Translation of WO 2019160982 A1 (Year: 2019).*
  (Continued)

*Primary Examiner* — Paul A Wartalowicz
*Assistant Examiner* — Slone Elizabeth Simkins
(74) *Attorney, Agent, or Firm* — Sheppard Mullin Richter & Hampton LLP

(57) ABSTRACT

A lithium adsorbent includes an aluminum-based adsorbing material, a binder, and a wetting and dispersing agent. The binder includes at least one of a vinylidene fluoride-chlorotrifluoroethylene (VDF-CTFE) copolymer and a fluoroolefin-vinyl ether copolymer. The wetting and dispersing agent includes one or more of polyethylene glycol, sodium polyacrylate, polyvinyl alcohol, and formaldehyde condensate.

9 Claims, 1 Drawing Sheet

<div style="display:flex">
<div>

(51) Int. Cl.

| | |
|---|---|
| *B01J 20/26* | (2006.01) |
| *B01J 20/28* | (2006.01) |
| *B01J 20/284* | (2006.01) |
| *B01J 20/34* | (2006.01) |
| *C01D 15/04* | (2006.01) |

(52) U.S. Cl.
CPC ....... *B01J 20/2803* (2013.01); *B01J 20/2808* (2013.01); *B01J 20/28083* (2013.01); *B01J 20/28085* (2013.01); *B01J 20/284* (2013.01); *B01J 20/3433* (2013.01); *B01J 20/3475* (2013.01); *C01D 15/04* (2013.01)

(58) Field of Classification Search
CPC ...... B01J 20/284; B01J 20/045; B01J 20/046; B01J 20/28078; B01J 20/3042; B01J 20/28007; B01D 15/08; C22B 3/24; C22B 3/42; C22B 26/12
See application file for complete search history.

(56) References Cited

U.S. PATENT DOCUMENTS

| | | | | |
|---|---|---|---|---|
| 2010/0021568 A1* | 1/2010 | Huang | ...................... | A61P 7/12 |
| | | | | 424/725 |
| 2011/0319673 A1* | 12/2011 | Dunne | ................... | B01D 53/28 |
| | | | | 252/75 |
| 2018/0261882 A1 | 9/2018 | Chang et al. | | |
| 2021/0094014 A1* | 4/2021 | Kuk | ......................... | B01J 20/02 |
| 2022/0024776 A1* | 1/2022 | Takano | .................... | C22B 3/24 |

FOREIGN PATENT DOCUMENTS

| | | | |
|---|---|---|---|
| CN | 102824759 A | 12/2012 | |
| CN | 103044917 A | 4/2013 | |

</div>
<div>

| | | | | | |
|---|---|---|---|---|---|
| CN | 104014308 A | 9/2014 | | | |
| CN | 104673505 A | 6/2015 | | | |
| CN | 106215516 A | 12/2016 | | | |
| CN | 106669636 A | 5/2017 | | | |
| CN | 108543514 A | 9/2018 | | | |
| CN | 108722341 A | 11/2018 | | | |
| CN | 108722372 A | 11/2018 | | | |
| CN | 108778487 A | 11/2018 | | | |
| CN | 108889290 A | 11/2018 | | | |
| CN | 109012567 A | 12/2018 | | | |
| CN | 109225124 A | 1/2019 | | | |
| CN | 109266851 A | 1/2019 | | | |
| CN | 110066415 A | 7/2019 | | | |
| CN | 110494214 A | 11/2019 | | | |
| CN | 110743516 A | 2/2020 | | | |
| CN | 110961070 A | 4/2020 | | | |
| CN | 111569845 A | 8/2020 | | | |
| CN | 112142076 A | 12/2020 | | | |
| CN | 112538575 A | 3/2021 | | | |
| CN | 112625625 A | 4/2021 | | | |
| WO | 2011058841 A1 | 3/2013 | | | |
| WO | WO-2019160982 A1 * | 8/2019 | ............. | B01J 47/12 |

OTHER PUBLICATIONS

Singh, A., Soni, P.K., Shekharam, T. and Srivastava, A. (2013), A study on thermal behavior of a poly(VDF-CTFE) copolymers binder for high energy materials. J. Appl. Polym. Sci., 127: 1751-1757. https://doi.org/10.1002/app.37780 (Year: 2013).*

Zheng Libing et al, "Preparation of PVDF-CTFE hydrophobic membranes for MD application: Effect of LiCl-based mixed additives", Journal of Membrane Science, Elsevier BV, NL,vol. 506, Jan. 27, 2016, pp. 71-85, XP029432201, ISSN:0376-7388, DOI:10.1016/j.memsci.2016.01.044.

Office Action dated Sep. 2, 2025, issued in Canadian Patent Application No. 3,237,296 (3 pages).

* cited by examiner

</div>
</div>

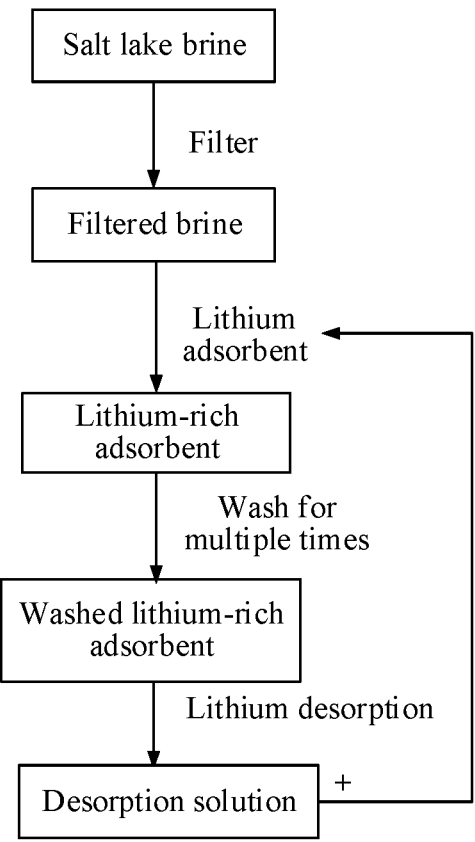

LITHIUM ADSORBENT AND METHOD FOR LITHIUM EXTRACTION FROM SALT LAKE

CROSS-REFERENCE TO RELATED APPLICATIONS

This application is based on and claims priority to and benefits of Chinese Patent Application No. 202111630402.6, filed on Dec. 28, 2021. The entire content of the above-referenced application is incorporated herein by reference.

FIELD

The present disclosure relates to the field of environmental protection and resource recycling, and specifically, to a lithium adsorbent and a method for lithium extraction from a salt lake.

BACKGROUND

In China, lithium resources are primarily stored in salt lake brines, mostly brines with high magnesium-to-lithium ratios. Therefore, lithium extraction from brines with high magnesium-to-lithium ratios becomes the focus of lithium resource development in China. The adsorption method developed in recent years has been widely favored due to its advantages of the good selectivity for lithium ions, simple process, the capability of extracting lithium from salt lake brines with high magnesium-to-lithium ratios, low cost, and the like.

The key to the adsorption method is to develop lithium adsorbents with excellent performance. However, in the process of lithium extraction of the current adsorption method, the lithium adsorbent used is low in adsorption efficiency to lithium and high in self-dissolution loss rate, and the adsorbed lithium is not easy to be cleaned and desorbed while consuming a large amount of water and leading to high loss of lithium during cleaning.

SUMMARY

In view of this, the present disclosure provides a lithium adsorbent that can be used in a process of lithium extraction from a salt lake. By using at least one of a vinylidene fluoride-chlorotrifluoroethylene (VDF-CTFE) copolymer and a fluoroolefin-vinyl ether copolymer as a binder, with the cooperation of a specific wetting and dispersing agent, the lithium adsorbent is endowed with a good mechanical strength and a low dissolution loss rate, and the lithium adsorption efficiency is increased, the service life is improved, the water consumption in the process of washing and lithium desorption of the adsorbent is reduced, the temperature of lithium desorption is reduced, and a desorption solution with a low magnesium-to-lithium ratio is obtained.

In an embodiment, according to a first aspect of the present disclosure, a lithium adsorbent is provided, including an adsorbing material, a binder, and a wetting and dispersing agent. The binder includes at least one of a vinylidene fluoride-chlorotrifluoroethylene (VDF-CTFE for short) copolymer and a fluoroolefin-vinyl ether copolymer (also referred to as FEVE fluorocarbon resin). The wetting and dispersing agent includes one or more of polyethylene glycol, sodium polyacrylate, polyvinyl alcohol, and formaldehyde condensate.

In an implementation of the present disclosure, the molecular weight of the vinylidene fluoride-chlorotrifluoroethylene (VDF-CTFE) copolymer or the fluoroolefin-vinyl ether copolymer may be 100,000-800,000.

In some implementations of the present disclosure, the wetting and dispersing agent includes polyethylene glycol with a molecular weight of 10,000-30,000.

In an implementation of the present disclosure, based on the weight of the lithium adsorbent, the content of the adsorbing material is 80-95 wt %, the content of the binder is 4-17 wt %, and the content of the wetting and dispersing agent is 1-5 wt %.

In some implementations of the present disclosure, a ratio of a mass of the adsorbing material to a sum of a mass of the binder and a mass of the wetting and dispersing agent is greater than or equal to 8:1.

According to a second aspect, the present disclosure provides a method for lithium extraction from a salt lake, including the following steps.

A salt lake brine is contacted with the lithium adsorbent according to the first aspect of the present disclosure to carry out lithium adsorption, to obtain a lithium-rich adsorbent.

The lithium-rich adsorbent is washed, and lithium desorption is carried out with a desorbent, to obtain a desorption solution.

In some implementations of the present disclosure, the lithium adsorption process is carried out with the salt lake brine having a flow rate of 1.5-3 BV/h for 2.5-4 h.

In an embodiment, the lithium adsorption process is performed with the salt lake brine having a flow rate of 1.5-3 BV/h for 2.5-4 h, the lithium-rich adsorbent is washed for a plurality of times with a cleaning agent in a flow rate of 6-9 BV/h, and a total amount of the cleaning agent is no more than 2.5 BV. A temperature of the desorbent is no more than 45° C. during the lithium desorption process.

The method for lithium extraction from a salt lake provided in the present disclosure is performed by using the foregoing lithium adsorbent, so the lithium adsorption efficiency can be increased. The method for lithium extraction from a salt lake has the advantages of simple process flow, low water consumption, low energy consumption, and high lithium extraction yield, which is convenient for large-scale industrial production.

BRIEF DESCRIPTION OF THE DRAWINGS

FIG. 1 is a flowchart of lithium extraction from a salt lake according to an embodiment of the present disclosure.

DETAILED DESCRIPTION

The technical solutions of the embodiments of the present disclosure are described in detail with multiple examples in the following.

In the present disclosure, the lithium adsorbent formed by combing the specific binder with the adsorbing material and the wetting and dispersing agent together has a high structural stability, a high mechanical strength, a good corrosion resistance, a low dissolution loss rate, and a long service life after repeated lithium adsorption-desorption cycles. In addition, the binder may also enable the adsorbent to form a surface state with a proper porosity and a narrow pore size, resulting in the high lithium adsorption efficiency of the lithium adsorbent, without reducing the effective active area of the lithium adsorbent to affect the adsorption rate and the efficiency of the lithium adsorbent. The wettability of the wetting and dispersing agent also helps to increase the adsorption efficiency and the adsorption capacity of the adsorbent for lithium ions. Moreover, under the synergistic effect of the surface smoothness and cleaning performance of the specific binder and the wettability of the wetting and dispersing agent, after the lithium adsorbent adsorbs lithium, impurities existing in the lithium adsorbent are easy to be cleaned up, the process of lithium desorption is easier to be carried out. Consequently, the water consumption for washing and desorption can be reduced, the dissolution loss rate of the adsorbent during washing and desorption can be reduced, and the desorption temperature can be reduced, which is of great significance for industrialized the lithium extraction in areas lacking water and energy such as salt lakes, and a qualified desorption solution with a low magnesium-to-lithium ratio and a high lithium content can be obtained.

In some implementations of the present disclosure, lithium extraction from salt lake brines with the foregoing lithium adsorbent can increase the lithium adsorption efficiency by 10% or more. For example, the extraction rate of the lithium adsorbent can reach 70-90% in a brine flow rate of 2.0-2.5 BV/h, and the lithium adsorbent is resistant to impact and corrosion of the brine, has an annual dissolution loss rate of less than 5% (where the dissolution loss rate refers to the mass percentage of the loss of the lithium adsorbent over use time), and has a long service life. The total water consumption for washing and desorption of the lithium adsorbent with adsorbed lithium ions can be reduced by about 20%, which has great economic and environmental benefits. In addition, the temperature for desorbing the absorbed lithium ions on the adsorbent can be reduced by 10° C. or more, even by about 30° C., and a qualified desorption solution with a lithium content higher than 500 mg/L can still be obtained.

In the present disclosure, the lithium adsorbent has pores. The presence of pores allows the lithium adsorbent to have a network of channels for gas and liquid diffusion. In an embodiment, the lithium adsorbent has a porosity of 20-45%. A proper porosity is beneficial for the lithium adsorbent to have a high adsorption/desorption rate under the condition of a high mechanical strength and a low dissolution loss rate. In an embodiment, the lithium adsorbent has a pore size distribution ranging from 1 nm to 100 nm.

In some implementations of the present disclosure, the molecular weight of the vinylidene fluoride-chlorotrifluoroethylene (VDF-CTFE) copolymer or the fluoroolefin-vinyl ether copolymer may be 100,000-800,000. A binder with a properly high molecular weight has a good binding effect and reduces the risk of cracking and breaking of the lithium adsorbent in use, thereby increasing the service life. In the vinylidene fluoride-chlorotrifluoroethylene (VDF-CTFE) copolymer, the copolymerization ratio of vinylidene fluoride (VDF) to chlorotrifluoroethylene (CTFE) may be 1:(1-5) or 1:4. In an embodiment, the binder is a vinylidene fluoride-chlorotrifluoroethylene (VDF-CTFE) copolymer or a mixture of a vinylidene fluoride-chlorotrifluoroethylene (VDF-CTFE) copolymer and a fluoroolefin-vinyl ether copolymer.

In the present disclosure, the wetting and dispersing agent includes one or more of polyethylene glycol, sodium polyacrylate, polyvinyl alcohol, and formaldehyde condensate. The formaldehyde condensate may include, but is not limited to, one or more of a naphthalenesulfonate formaldehyde condensate, a methyl naphthalenesulfonate formaldehyde condensate, a benzyl naphthalenesulfonate formaldehyde condensate, and a phenol sulfonate formaldehyde condensate. In an embodiment, the molecular weight of the formaldehyde condensate is 4,000-10,000. The molecular weight of the sodium polyacrylate is 5,000-10,000.

In some implementations of the present disclosure, the wetting and dispersing agent is polyethylene glycol. Polyethylene glycol has excellent wettability and dispersibility. In an embodiment, the molecular weight of polyethylene glycol is 10,000-30,000. Polyethylene glycol with a high molecular weight is less soluble in water, resulting in a high service life of the adsorbent.

In some implementations of the present disclosure, based on the weight of the lithium adsorbent, the content of the adsorbing material is 80-95 wt %, the content of the binder is 4-17 wt %, and the content of the wetting and dispersing agent is 1-5 wt %. With the cooperation of the adsorbing material, the binder, and the wetting and dispersing agent in proper proportions, the lithium adsorbent can have a good structural stability, adsorption effect, and desorption effect. In an embodiment, the content of the adsorbing material is 85-92 wt %. In an embodiment, the content of the binder is 5-15 wt % or 6-12 wt %. In an embodiment, the content of the wetting and dispersing agent is 1-3 wt %.

In some implementations of the present disclosure, the mass of the binder is 8-12.5% of the mass of the adsorbing material. A proper amount of binder can weaken the effect of reducing the adsorption capacity of the obtained lithium adsorbent while ensuring a high structural stability and a long service life (not easily being broken) of the lithium adsorbent.

In an implementation of the present disclosure, the mass of the wetting and dispersing agent is 1-5% of the mass of the adsorbing material. Polyethylene glycol can render the distribution of the adsorbing material more uniform in the lithium adsorbent particles and the skeleton of the adsorbing material more stable, and can increase the wettability of the lithium adsorbent particles, resulting in an increased lithium adsorption/desorption rate. In addition, polyethylene glycol can also dissolve slowly in the brine, so that the porosity of the adsorbent increases slowly, further increasing the adsorption efficiency of the adsorbent. Polyethylene glycol may not significantly affect the dissolution loss rate of the adsorbent or reduce the service life of the adsorbent.

In some implementations of the present disclosure, a ratio of a mass of the adsorbing material to a sum of the masses of the binder and the wetting and dispersing agent is greater than or equal to 8:1. In this way, the lithium adsorbent has good structural stability and excellent adsorption and desorption performance. In an embodiment, the ratio may be (8-10):1. The ratio may be specifically 8.5:1, 9:1, or 9.5:1, etc.

In the present disclosure, the adsorbing material may be an aluminum-based adsorbing material, a manganese-based adsorbing material (such as a combination of spinel-type manganese oxide and lithium ions), a titanium-based adsorbing material (such as a metatitanic acid-type lithium ion-sieve adsorbent), an iron-based adsorbing material, or the like. In some implementations of the present disclosure, the adsorbing material is an aluminum-based adsorbing material. The aluminum-based adsorbing material is a combination of aluminum hydroxide and a lithium-containing compound (such as lithium halide or lithium sulfate). The aluminum-based adsorbing material can adsorb lithium ions from a lithium-containing solution until saturated, and the lithium ions are eluted with water at a specific temperature to be desorbed from the aluminum-based adsorbing material into a solution. Generally, this type of material is mainly composed of aluminum hydroxide, with a lithium compound embedded inside/outside, which optimally has an octahedral space structure. In some implementations, the aluminum-based adsorbing material may be expressed as $LiaX \cdot mAl$ $(OH)_3 \cdot nH_2O$, where X may be $Cl^-$ or $SO_4^{2-}$; a=1 or 2; m is 1-5 or 2; and n is 1-5. Further, in order to enhance the lithium adsorption capability of the lithium adsorbent in the present disclosure, before carrying out lithium extraction from a salt lake with the lithium adsorbent in the present disclosure, the lithium adsorbent may be subjected to lithium desorption properly to provide more lithium vacancies on the adsorbing material. For example, the lithium desorption may be carried out by introducing water at a flow rate of 2-3 BV/h for 10 h or more. The aluminum-based adsorbing material obtained after the lithium desorption may be expressed as (1-x) $Li_a \cdot X \cdot mAl(OH)_3 \cdot nH_2O$, 0<x<1.

The aluminum-based adsorbing material may be prepared by mechanochemical synthesis, soaking, acidification conversion, or precipitation. For example, $LiCl \cdot mAl$ $(OH)_3 \cdot nH_2O$ may be prepared by soaking aluminum hydroxide into a LiCl solution, or by soaking aluminum hydroxide into a LiOH solution followed by acidification conversion, or by co-precipitating $AlCl_3$ and a LiCl solution, or by grinding LiOH and aluminum hydroxide.

In an implementation of the present disclosure, the lithium adsorbent is columnar particles. The columnar lithium adsorbent particles are simple in formation and high in surface smoothness, which can prevent the wear or powder loss due to mutual squeeze and friction during use and can reduce loss. In an embodiment, the lithium adsorbent particles have a diameter of 1.2-1.8 mm and a length of 1.5-2.5 mm. The lithium adsorbent with such morphology and a proper size can render the path for liquid and ions to diffuse more properly. When the adsorbent particles squeeze with each other, it is easy to leave certain spaces to facilitate the penetration of the brine, so as to increase the adsorption efficiency for lithium ions, and it is easier to carry out the ion exchange between lithium ions and water during desorption, so as to reduce the lithium desorption temperature and the water consumption for desorption to ensure that the adsorbed lithium can be completely desorbed.

According to an embodiment, a method for preparing the foregoing lithium adsorbent is provided, including the following steps.

The binder, the wetting and dispersing agent, the adsorbing material, and a solvent are mixed to obtain a mixed material. The binder includes at least one of a vinylidene fluoride-chlorotrifluoroethylene (VDF-CTFE) copolymer and a fluoroolefin-vinyl ether copolymer. The wetting and dispersing agent includes polyethylene glycol.

The mixed material is shaped and granulated to obtain the lithium adsorbent.

In some implementations, the mixing is carried out by any one or more of stirring, ball milling, and mechanofusion. In some embodiments, the mixing is carried out by stirring. In an embodiment, a rotational speed of the stirring is 60-100 rpm. In an embodiment, in order to obtain the mixed material with a good mixing effect, the binder, the wetting and dispersing agent, and the solvent may be first mixed, and then the aluminum-based adsorbing material is added to mix. The solvent may include any one or more of acetone, ethyl acetate, butyl ethanoate, and tetrahydrofuran.

In an implementation of the present disclosure, the shaping and granulating may be carried out by spray drying or by using a granulator, which is not limited thereto. For the shaping and granulating, a molten mixed solution is generally processed at a specific temperature, the solvent can be removed during the granulation, so the lithium adsorbent particles obtained after the granulation generally do not contain the solvent. For example, after the mixed material is transferred into a granulator, round strips may be first squeezed out or cut out, and then cut into columnar particles of a certain length by rotating blades.

In other implementations of the present disclosure, the mixed material may also contain a pore-forming agent (such as bicarbonate). After the shaping and granulating, the pore-forming agent such as bicarbonate may be removed by heating, and consequently the lithium adsorbent is endowed with a certain porosity.

The method for preparing the lithium adsorbent provided in the present disclosure is simple, easy to operate, and suitable for large-scale production. The prepared lithium adsorbent has a stable structure, a long service life, and a good lithium adsorption/desorption effect.

According to an embodiment, a method for lithium extraction from a salt lake is provided, including the following steps.

A salt lake brine is contacted with the lithium adsorbent according to the first aspect of the present disclosure to carry out lithium adsorption, to obtain a lithium-rich adsorbent.

The lithium-rich adsorbent is washed, and lithium desorption is carried out with a desorbent, to obtain a desorption solution.

In the present disclosure, the salt lake brine is contacted with the lithium adsorbent to adsorb lithium ions in the salt lake brine on the lithium adsorbent, so that the lithium adsorbent becomes the lithium-rich adsorbent. The lithium adsorbent may be filled in a carrier such as an exchange column (such as a glass column or a stainless steel column) or an adsorption tower. The salt lake brine is allowed to flow through the carrier containing the lithium adsorbent to be in contact with the lithium adsorbent, so that the adsorption of lithium from the brine may be implemented. Then, the carrier containing the lithium-rich adsorbent is washed to remove impurities on the surface of the lithium-rich adsorbent. Finally, the desorbent is contacted with the lithium-rich adsorbent to desorb the lithium ions adsorbed on the lithium-rich adsorbent, the lithium ions enter the desorbent to form a lithium-containing desorption solution, and a lithium adsorbent is regenerated from the lithium-rich adsorbent.

In an embodiment, before the salt lake brine is contacted with the lithium adsorbent, the method further includes: filtering the brine to remove the impurities (especially granular impurities). The filtering may be carried out using any one or more of a bag filter, a backwashing filter, and a candle filter. In this way, it can be ensured that the material obtained through filtering does not affect the adsorption function of the lithium adsorbent.

In some implementations of the present disclosure, the lithium adsorption process is carried out with the salt lake brine having a flow rate of 1.5-3 BV/h (BV generally refers to a filling volume of the lithium adsorbent), such that 1.5-3 BV/h represents that the volume of the brine flowing per hour is 1.5-3 times the volume of the lithium adsorbent. In an embodiment, the lithium adsorption may be carried out for 2.5-4 h, such as 2.8 h, 3 h, 3.5 h, or 3.8 h, etc.

In an embodiment, a total amount of the salt lake brine to undergo adsorption is 6-8 BV, that is, the volume of the salt lake brine to be in contact with the lithium adsorbent is 6-8 times the volume of the lithium adsorbent filled. The amount of the salt lake brine to undergo adsorption may vary according to the content of lithium in the salt lake brine (generally 60-500 ppm).

In an embodiment, the content of lithium adsorbed by the lithium adsorbent is controlled to 1.8-2.8 mg/g. In this way, a low content of lithium in the obtained desorption solution, which is not suitable for the subsequent preparation of lithium carbonate, caused by a low content of lithium adsorbed by the lithium adsorbent can be avoided. An increased adsorption time, a reduced production efficiency, and a high dissolution loss rate of the adsorbent caused by a high content of lithium adsorbed by the lithium adsorbent can also be avoided.

In the present disclosure, the lithium-rich adsorbent is washed to remove impurities on the surface of the lithium-rich adsorbent with lithium ions adsorbed. The washing may be carried out for multiple times, for example, 2-4 times or 3-4 times. The washing is carried out with a cleaning agent in a flow rate of 6-9 BV/h, such as 6.5, 7, 8, 8.5, or 9 BV/h.

In an embodiment, in some implementations, each time of washing may be carried out for 3-6 min. A total duration for washing is within 25 min or within 20 min. In an embodiment, a total amount of the cleaning agent is no more than 2.5 By. The cleaning agent may be pure water or less saline water. The pure water may be deionized water, distilled water, groundwater, tap water, or the like.

In the present disclosure, the washed lithium-rich adsorbent is subjected to lithium desorption with a desorbent to desorb lithium ions adsorbed on the lithium-rich adsorbent and regenerate the lithium adsorbent. The lithium adsorbent regenerated is in contact with the salt lake brine to adsorb and extract lithium, and the obtained desorption solution is further processed and utilized.

In an implementation of the present disclosure, the desorbent is deionized water, distilled water, clean groundwater, tap water, or the like. The temperature of the desorbent (that is, the temperature for desorption) may be no more than 45° C., such as 28° C., 30° C., 32° C., 35° C., 38° C., or 40° C. Because the foregoing lithium adsorbent is used in the method for lithium extraction from a salt lake brine, the temperature of the desorbent may be lowered during desorption to save the heating energy. In some implementations, the temperature of the desorbent may be no more than 40° C., for example, 30-40° C. or 30-35° C.

In an embodiment, a flow rate of the desorbent is 1.5-2.5 BV/h, such as 1.8 BV/h, 2 BV/h, or 2.2 BV/h. In this way, it can be ensured that the content of lithium ions in the desorption solution is high, and the desorption may not take a long time. In an embodiment, the desorption may be carried out for 2.5-4 h, such as 2.8 h, 3 h, 3.5 h, or 3.8 h.

In an embodiment, the magnesium-lithium mass ratio of the desorption solution is 5 or less, such as 3 or less.

The method for lithium extraction from a salt lake provided in the present disclosure is performed by using the foregoing lithium adsorbent, so the lithium adsorption efficiency can be increased by 10% or more, for example, the adsorption and extraction rate of the adsorbent can reach 70-90% at a flow rate of the brine of 2.0-2.5 BV/h. Further, the water consumption for washing and desorption of the lithium-rich adsorbent can be reduced by about 20%, the temperature for desorption can be significantly reduced by at least 10° C. or more, even can be reduced by about 30° C., and a qualified desorption solution with a lithium content higher than 500 mg/L can still be obtained. By this method, the use of heating energy is reduced, which has great economic and environmental benefits for lithium extraction from salt lakes in water-deficient and energy-deficient areas.

The composition of the salt lake brine to undergo lithium extraction used in the following examples is shown in Table 1 below.

TABLE 1

| Composition of salt lake brine | |
|---|---|
| Li (%) | 0.0138 |
| Na (%) | 0.2325 |
| Mg (%) | 7.0719 |
| K (%) | 0.6241 |
| Ca (%) | 0.2970 |
| B (%) | 0.0133 |
| Cl⁻ (%) | 22.7497 |
| $SO_4^{2-}$ (%) | 0.0577 |
| Mg:Li | 222.4 |

Example 1

A method for preparing the lithium adsorbent includes the following steps.

A binder (specifically a VDF-CTFE copolymer with a molecular weight of about 20,000) and polyethylene glycol (with a molecular weight of 10,000) were dispersed into a solvent (specifically ethyl acetate and acetone in a volume ratio of 9:1) and uniformly stirred at a high speed, and an adsorbing material $LiCl \cdot 2Al(OH)_3 \cdot nH_2O$ was added and stirred uniformly, to obtain a mixed material. In the mixed material, the adsorbing material, the binder, and the polyethylene glycol 10,000 were in a mass ratio of 9:0.9:0.1. The mixed material was shaped and granulated with a granulating agent, and the solvent was removed, to obtain the lithium adsorbent. The lithium adsorbent was columnar particles with a diameter of about 1.5 mm and a length of about 2.2 mm. The lithium adsorbent had a porosity of 34% and a pore size distribution ranging from 3 nm to 50 nm.

The lithium adsorbent obtained in Example 1 was used for lithium extraction from a salt lake. Before being used for the lithium extraction from a salt lake, the lithium adsorbent needs to undergo lithium desorption to a certain extent, so as to provide lithium vacancies. The lithium desorption may be carried out by introducing water at a flow rate of 2-3 BV/h for 10 h or more.

In an embodiment, the flowchart of the lithium extraction from a salt lake is shown in FIG. 1, specifically including the following steps.

(1) The lithium adsorbent obtained in Example 1 was filled in a glass adsorption column in a filling volume of 0.9 dm³. A salt lake brine to undergo lithium extraction was first filtered by using a backwashing filter and then allowed to flow through the adsorption column containing the lithium adsorbent at a flow rate of 2 BV/h, so that lithium ions therein were adsorbed on the lithium adsorbent to convert the lithium adsorbent into a lithium-rich adsorbent. 5400 mL (that is, 6 BV) of brine to undergo adsorption underwent the adsorption at 25° C. for about 3 h.

(2) The adsorption column containing the lithium-rich adsorbent was washed with water to remove impurities on the surface of the lithium-rich adsorbent. The washing was carried out with water at a flow rate of 7.5 BV/h for 4 times, taking 5 min each time for a total of 20 min, with a total water consumption of 2250 mL, that is, 2.5 BV.

(3) The washed lithium-rich adsorbent was leached with clean tap water in a flow rate of 2 BV/h at 30° C. to desorb the lithium ions adsorbed, to obtain a desorption solution. The desorption was carried out with a total water consumption of 2000 mL for 3 h.

A lithium adsorption capacity and an adsorption yield during the adsorption, and a lithium content and a magnesium-to-lithium ratio in the desorption solution were measured. The lithium adsorption capacity was represented by a ratio of the mass of lithium adsorbed by the adsorbent (that is, a difference between the mass of lithium in the brine after adsorption and the mass of lithium in the brine before adsorption) to the mass of the adsorbent. The adsorption yield (also referred to as lithium extraction efficiency) was represented by a ratio of the mass of lithium adsorbed by the adsorbent to the mass of lithium in the original brine.

In addition, the foregoing adsorption-washing-desorption process was repeated for 100 cycles. A decreased proportion of the weight of the adsorbent after 100 cycles compared with the weight of the adsorbent after one cycle was measured. The decreased proportion can be used to measure the stability of the adsorbent. Moreover, the heat resistance of the adsorbent in Example 1 was also tested, including the following steps. The lithium adsorbent that had not been used for adsorption from the brine was soaked in hot water at 60° C. for 1 h and sampled to detect the content of lithium ions (mg/L) in the hot water. A higher content of lithium ions detected in the water indicates that the lithium adsorbent has a greater degree of structural damage and a worse heat resistance.

The above results are summarized in Table 2 below.

Example 2

The difference of the lithium adsorbent between Example 2 and Example 1 lies in the following. The binder used herein was FEVE fluorocarbon resin with a molecular weight of 20,000. The lithium adsorbent in Example 2 had a porosity of 27% and a pore size distribution ranging from 5 nm to 45 nm.

According to the method in Example 1, the lithium adsorbent in Example 2 was subjected to various tests shown in Table 2.

Example 3

The difference of the lithium adsorbent between Example 3 and Example 1 lies in the following. The binder used herein was VDF-CTFE copolymer and FEVE fluorocarbon resin in a mass ratio of 1:1. The molecular weight of polyethylene glycol was 2,000. The lithium adsorbent in Example 3 had a porosity of 37% and a pore size distribution ranging from 3 nm to 45 nm.

According to the method in Example 1, the lithium adsorbent in Example 3 was subjected to various tests shown in Table 2.

Example 4

The difference of the lithium adsorbent between Example 4 and Example 1 lies in the following. The adsorbing material, the binder, and the polyethylene glycol were in a mass ratio of 9.5:0.4:0.1. The lithium adsorbent in Example 4 had a porosity of 28% and a pore size distribution ranging from 1 nm to 20 nm.

According to the method in Example 1, the lithium adsorbent in Example 4 was subjected to various tests shown in Table 2.

Example 5

The difference of the lithium adsorbent between Example 5 and Example 1 lies in the following. The adsorbing material, the binder, and the polyethylene glycol were in a mass ratio of 8:1.7:0.3. The lithium adsorbent in Example 5 had a porosity of 40% and a pore size distribution ranging from 10 nm to 90 nm.

According to the method in Example 1, the lithium adsorbent in Example 5 was subjected to various tests shown in Table 2.

Example 6

The difference of the lithium adsorbent between Example 6 and Example 1 lies in the following. The molecular weight of the binder (VDF-CTFE copolymer) used was 200,000. The lithium adsorbent in Example 6 had a porosity of 32% and a pore size distribution ranging from 3 nm to 40 nm.

According to the method in Example 1, the lithium adsorbent in Example 6 was subjected to various tests shown in Table 2.

Example 7

The difference of the lithium adsorbent between Example 7 and Example 1 lies in the following. The molecular weight of the binder (VDF-CTFE copolymer) used was 600,000. The lithium adsorbent in Example 7 had a porosity of 35% and a pore size distribution ranging from 3 nm to 65 nm.

According to the method in Example 1, the lithium adsorbent in Example 7 was subjected to various tests shown in Table 2.

Example 8

The difference of the lithium adsorbent between Example 8 and Example 1 lies in the following. The molecular weight of the binder (VDF-CTFE copolymer) used was 1,000,000. The lithium adsorbent in Example 8 had a porosity of 42% and a pore size distribution ranging from 6 nm to 100 nm.

According to the method in Example 1, the lithium adsorbent in Example 8 was subjected to various tests shown in Table 2.

Example 9

The difference of the lithium adsorbent between Example 9 and Example 1 lies in the following. The wetting and dispersing agent used was polyethylene glycol with a molecular weight of 5,000. The lithium adsorbent in Example 9 had a porosity of 31% and a pore size distribution ranging from 2 nm to 37 nm.

According to the method in Example 1, the lithium adsorbent in Example 9 was subjected to various tests shown in Table 2.

Example 10

The difference of the lithium adsorbent between Example 10 and Example 1 lies in the following. The wetting and dispersing agent used was sodium polyacrylate with a molecular weight of 6,000. The lithium adsorbent in Example 10 had a porosity of 33% and a pore size distribution ranging from 3 nm to 55 nm.

According to the method in Example 1, the lithium adsorbent in Example 10 was subjected to various tests shown in Table 2.

In order to highlight the beneficial effects of the embodiments of the present disclosure, the following comparative examples are provided.

Comparative Example 1

A lithium adsorbent was used, containing an adsorbing material LiCl·2Al(OH)$_3$·nH$_2$O and a binder epoxy in a mass ratio of 9:1.

According to the method in Example 1, the lithium adsorbent in Comparative Example 1 was subjected to various tests shown in Table 2.

Comparative Example 2

A lithium adsorbent was used, containing an adsorbing material LiCl·2Al(OH)$_3$·nH$_2$O and a binder polyvinylidene fluoride in a mass ratio of 9:1.

According to the method in Example 1, the lithium adsorbent in Comparative Example 2 was subjected to various tests shown in Table 2.

Comparative Example 3

A lithium adsorbent was used, containing an adsorbing material LiCl·2Al(OH)$_3$·nH$_2$O, a binder polyvinylidene fluoride, and a dispersing agent polyethylene glycol in a mass ratio of 9:0.9:0.1.

According to the method in Example 1, the lithium adsorbent in Comparative Example 2 was subjected to various tests shown in Table 2.

Test results of the above examples and comparative examples are summarized in Table 2 below.

tural stability and a long service life. In addition, it can be learned from the comparison between Example 1 and Comparative Examples 1-3 that when the lithium extraction was carried out by the adsorbents in the examples of the present disclosure and comparative examples under the same conditions, the magnesium-to-lithium ratio in the desorption solution obtained in this example of the present disclosure is lower than that in the comparative examples, indicating that there are less impurities in the desorption solution, achieving lithium-magnesium separation, and indicating that the lithium adsorbent in this example of the present disclosure is easy to clean, and the water consumption for cleaning can be further reduced.

Moreover, if the adsorption capacity of the adsorbent is higher, generally, the higher the desorption temperature is, the higher the lithium content in the desorption solution is. Under the same conditions of adsorption capacity, if the desorption temperature of the difficult-to-desorb adsorbent is the same as that of the easy-to-desorb adsorbent, the desorption solution obtained from the former has a lower lithium content. For example, from the comparison between Example 5 and Comparative Example 1, the adsorption capacities are the same, but the lithium contents in the desorption solution are very different. It is necessary to increase the desorption temperature of Comparative Example 1 to about 40° C. (by 10° C.) to obtain the lithium content same as that in Example 5. In addition, the proportion of the adsorbing material in the adsorbent of Example

TABLE 2

| Number | Lithium adsorption capacity (mg/g) | Adsorption yield (%) | Lithium content in desorption solution (mg/L) | Magnesium-to-lithium ratio in desorption solution | Lithium content in water after heat resistance test of adsorbent (mg/L) | Decreased proportion of weight of adsorbent after 100 cycles |
|---|---|---|---|---|---|---|
| Example 1 | 2.25 | 72 | 526 | 2.3:1 | 5 | <0.1% |
| Example 2 | 2.2 | 70 | 517 | 2.1:1 | 6 | <0.1% |
| Example 3 | 2.4 | 76 | 535 | 2.2:1 | 4 | <0.1% |
| Example 4 | 2.6 | 82 | 528 | 2.8:1 | 9 | 0.9% |
| Example 5 | 1.8 | 60 | 437 | 3:1 | 3 | <0.1% |
| Example 6 | 2.3 | 73 | 529 | 2.2:1 | 4 | <0.1% |
| Example 7 | 2.3 | 73 | 528 | 2.2:1 | 4 | <0.1% |
| Example 8 | 2.25 | 72 | 522 | 2.4:1 | 8 | 0.6% |
| Example 9 | 2.25 | 71 | 525 | 2.4:1 | 10 | 0.7% |
| Example 10 | 2.25 | 70 | 524 | 2.5:1 | 5 | <0.1% |
| Comparative Example 1 | 1.8 | 60 | 361 | 4:1 | 36 | 5% |
| Comparative Example 2 | 1.9 | 61 | 403 | 3.5:1 | 16 | 1.1% |
| Comparative Example 3 | 2.0 | 63 | 431 | 3.5:1 | 13 | 1% |

It can be learned from Table 2 that in the case that the mass proportions of the adsorbing materials in the adsorbents are the same, the lithium adsorbent in Example 1 of the present disclosure uses a specific binder and wetting and dispersing agent, so the lithium ions are less dissolved out of the adsorbent under relatively hot conditions, indicating that the adsorbent has a structure that is not easily damaged and an excellent heat resistance. After repeated adsorption-desorption cycles, the rate of damage to the adsorbent in the examples of the present disclosure is low, and the weight loss rate of the adsorbent is much lower than that of each comparative example, indicating that the adsorbent provided in the examples of the present disclosure has a high strucis lower than that of Comparative Example 1, but the adsorption yield and the lithium adsorption capacity of the two examples are similar, further indicating that the specific binder and polyethylene glycol provided in the present disclosure also contribute to the improvement of the adsorption effect of the adsorbent. The proportion of the binder in the adsorbent of Example 5 is higher than that of Examples 1-4, so the adsorbent of Example 5 has an optimal structural stability, and consequently has the lowest lithium content in water after the heat resistance test and the lowest decreased proportion of the weight after 100 cycles.

Moreover, the difference between Example 1 and Examples 6-8 only lies in different molecular weights of the binder VDF-CTFE copolymer. When the molecular weight of the copolymer is in the range of 100,000-800,000, the lithium adsorbent has a good desorption effect and a good self-stability. The difference between Example 1 and Example 9 only lies in different molecular weights of the wetting and dispersing agent PEG. The molecular weight of PEG of Example 9 is lower, so its thermostability and structural stability are slightly lower than that of Example 1.

The above descriptions are merely exemplary implementations of the present disclosure. It should be noted that, a person of ordinary skill in the art may make various improvements and refinements without departing from the principle of the present disclosure. These improvements and refinements shall fall within the protection scope of the present disclosure.

What is claimed is:

1. A lithium adsorbent, comprising an adsorbing material, a binder, and a wetting and dispersing agent, wherein the binder comprises at least a vinylidene fluoride-chlorotrifluoroethylene copolymer, and the wetting and dispersing agent comprises one or more of polyethylene glycol, sodium polyacrylate, polyvinyl alcohol, and formaldehyde condensate;

wherein a molecular weight of the vinylidene fluoride-chlorotrifluoroethylene copolymer is 200,000 g/mol to 600,000 g/mol; and wherein a decreased proportion of weight of the lithium adsorbent after 100 cycles of adsorption-washing-desorption is less than 0.1%.

2. The lithium adsorbent according to claim 1, wherein based on a weight of the lithium adsorbent, content of the adsorbing material is 80-95 wt %, content of the binder is 4-17 wt %, and content of the wetting and dispersing agent is 1-5 wt %.

3. The lithium adsorbent according to claim 2, wherein a ratio of a mass of the adsorbing material to a sum of a mass of the binder and a mass of the wetting and dispersing agent is greater than or equal to 8:1.

4. The lithium adsorbent according to claim 2, wherein a mass of the binder is 8%-12.5% of a mass of the adsorbing material.

5. The lithium adsorbent according to claim 1, wherein the wetting and dispersing agent comprises polyethylene glycol with a molecular weight of 10,000 g/mol to 30,000 g/mol.

6. The lithium adsorbent according to claim 1, wherein the lithium adsorbent has a porosity of 20%-45% and a pore size ranging from 1 nm to 100 nm.

7. A method for lithium extraction from a salt lake, comprising:

contacting a salt lake brine with a lithium adsorbent to perform a lithium adsorption process, and obtaining a lithium-rich adsorbent; and washing the lithium-rich adsorbent, performing a lithium desorption process with a desorbent, and obtaining a desorption solution, wherein the lithium adsorbent comprises an adsorbing material, a binder, and a wetting and dispersing agent, the binder comprises at least a vinylidene fluoride-chlorotrifluoroethylene copolymer, and the wetting and dispersing agent comprises one or more of polyethylene glycol, sodium polyacrylate, polyvinyl alcohol, and formaldehyde condensate;

wherein a molecular weight of the vinylidene fluoride-chlorotrifluoroethylene copolymer is 200,000 g/mol to 600,000 g/mol; and wherein a decreased proportion of weight of the lithium adsorbent after 100 cycles of adsorption-washing-desorption is less than 0.1%.

8. The method according to claim 7, wherein the lithium adsorption process is performed with the salt lake brine having a flow rate of 1.5-3 BV/h for 2.5-4 h; and the lithium-rich adsorbent is washed for a plurality of times with a cleaning agent in a flow rate of 6-9 BV/h, and a total amount of the cleaning agent is no more than 2.5 BV.

9. The method according to claim 7, wherein a temperature of the desorbent is no more than 45° C. during the lithium desorption process.

* * * * *